United States Patent Office 3,347,087
Patented Oct. 17, 1967

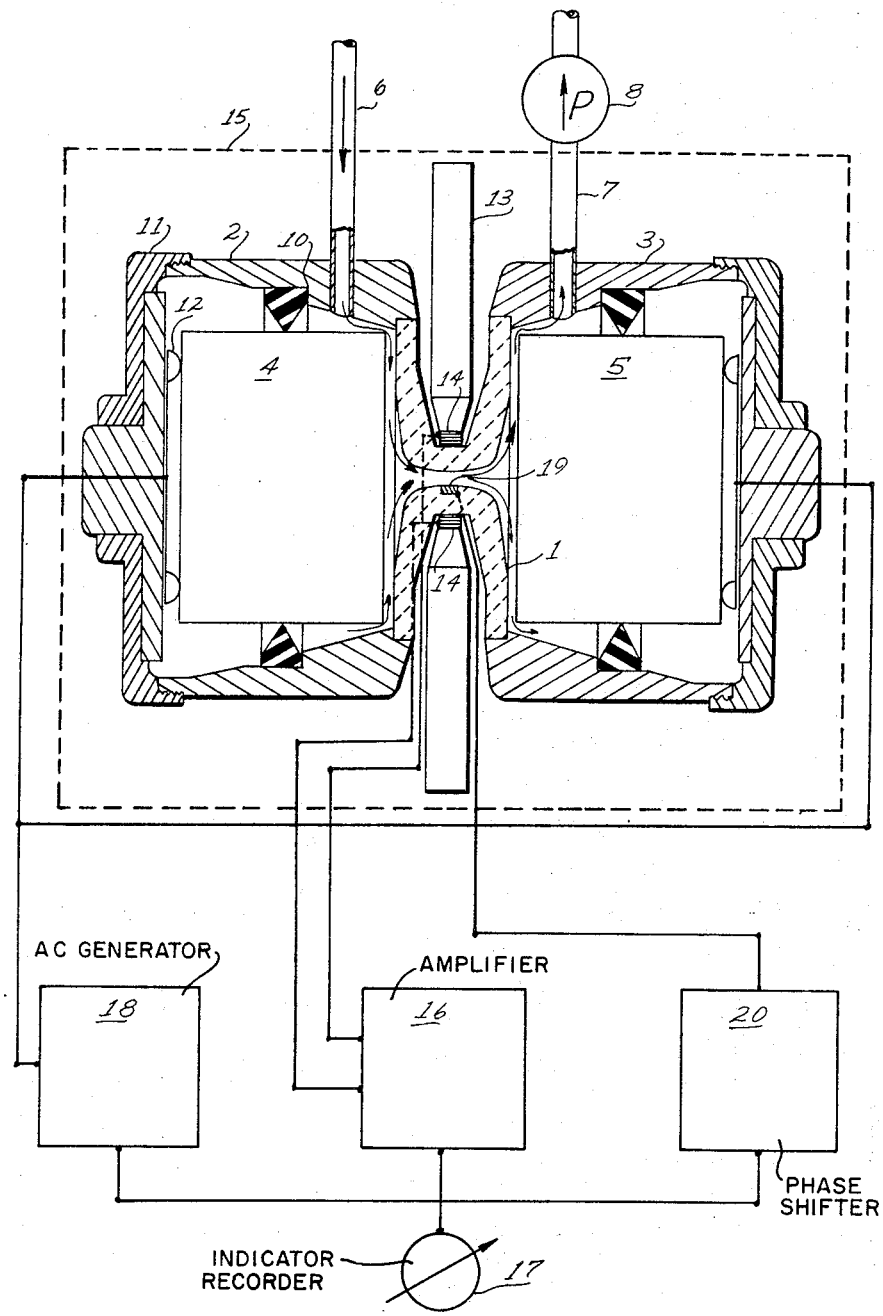

3,347,087
DEVICE FOR MEASURING THE CONTENT OF PARAMAGNETIC GASES IN GAS MIXTURES
Heinz Engelhardt, Frankfurt am Main, Praunheim, Helmar Krupp, Frankfurt am Main, Helmut Rabenhorst, Frankfurt am Main, Niederrad, Gottfried Spengler, Hofheim, Taunus, and Harry Wismath, Frankfurt am Main, Germany, assignors to Hartmann & Braun Aktiengesellschaft, a corporation of Germany
Filed June 1, 1964, Ser. No. 371,358
Claims priority, application Germany, June 5, 1963, H 49,362
9 Claims. (Cl. 73—24)

ABSTRACT OF THE DISCLOSURE

The invention is an analyzer for paramagnetic gases wherein sample gas in a chamber is in a magnetic circuit and subjected to pressure alternations of sufficient frequency to produce sound waves in the sample, the sound wave length and chamber dimensions being so related that an antinode exists in a predetermined zone of the chamber. An inductor coil near such zone senses change of reluctance in the circuit due to change in pressure on the sample and partial pressure of magnetic gas content as a measure of the latter. Feedback means are provided to maintain constant wave length under varying composition of sample gas.

---

This invention relates to analyzers for measuring the content of a paramagnetic component in a gaseous mixture. Such analyzers are of special use for the measuring of oxygen contents since oxygen exhibits strong paramagnetism relative to almost all other gases encountered in technical or industrial processes. Changes in paramagnetic susceptibility of a gaseous mixture follow, for example, changes in oxygen content of the gas. Moreover the effect is proportional to the gas pressure and inversely proportional to gas temperature. Since the pressure and temperature can be determined in a known manner, the oxygen content can be determined from a measure of the magnetic susceptibility of a gaseous mixture.

An analyzer to measure paramagnetic gas content is known wherein a measuring chamber is disposed between two poles of a magnet while the gas mixture in the chamber is periodically subjected to a pressure change and the change of flux in the magnetic circuit determined. In such analyzers the frequency is some 10 c.p.s. For the pressure modulation or alternating pressures, periodically acting pistons or membranes, gas flow choppers or rotating eccentric disks are employed. The low frequency realized by these pressure-altering means present a number of difficulties in the measuring process. It is necessary to use special amplifiers for the induced voltage. It also is necessary to isolate or shield fully against stray fields due to commercial power at 60 or 50 c.p.s. and this is quite difficult. The low frequencies have a correspondingly lower response time and the measuring cannot be carried out at high gas stream velocities. In short, the alternating pressure obtainable with these means is limited.

It has been found that the shortcomings of the prior art can be avoided when sound emitters are provided in the measuring chamber to produce such standing sound waves that a pressure antinode lies between the poles in the zone of the strong magnetic lines of force. In this way it is possible with relatively simple technical equipment to produce pressure variations of high frequency and amplitude directly in the region of the greatest field strength and thereby obtain a good working difference or gradient. The construction of an arrangement for utilizing these findings is explained in connection with an electro-acoustical sound generator and especially an ultrasonic generator.

By use of ultrasonic sound the dimension of the measuring chamber especially may be very small so that a short response time is possible. The invention easily lends itself to enabling a continuous or steady gas change in the measuring chamber. Especially advantageous is the use of a tubular shaped measuring chamber whose diameter decreases from each end toward the middle and has the opposite open ends covered by two piezo-electric sound generators. The gas mixture enters and leaves the measuring chamber at the boundary positions between the measuring chamber and the sound generators, the ultrasonic generator being so excited that a zone of maximum pressure variation develops in the chamber between the pole pieces of the magnetic circuit.

The zone of greatest pressure variation lies exactly in the middle of the chamber, when the relationship $$L = n \cdot \frac{\lambda}{2}$$

obtains, where $L$ is the length of the chamber, $\lambda$ the wave length of the sound from the generators and $n$ is a positive integer, and a phase displacement of $\varphi = n \cdot 180°$ prevails for the generators.

In the drawing:

An end-to-end symmetrical ceramic tube 1 having a pronounced constriction at its mid-portion closes around the space of the measuring chamber leaving flaring open ends. The chamber length $L$ is a whole number multiple of half a wave length $\lambda$ of the ultrasonic sound pervading the chamber.

At the ends of the ceramic tubes are mounted annular holders 2 and 3 for cylindrical piezo-electric ultrasonic sound generators 4 and 5. The sound generators form the ends of the measuring chamber and cover the openings completely yet without directly touching the walling of the ceramic tube. The gas mixture being analyzed passes through the remaining space, the gas entering through an inlet conduit 6 to the left half and being drawn out the right half through an outlet conduit by a pump 8. The generator 4 is mounted in a ring of suitable material having a centrally directed knife-edge at the nodal portion of the generator, the ring being disposed in an outwardly open annular rabbet groove 10. The generator and ring are urged into the groove by means of contact springs 12 insulatedly mounted on the inner wall of a retaining member 11 screwed onto the holder 2, the springs making electrical contact with the generator. The generator 5 on the right side is mounted in a corresponding manner. The tube 1, the holders 2 and 3, with their insulated caps are all substantially gas tight.

The zone of the small cross section of the measuring chamber 1 lies between the poles of a permanent magnet 13. Induction coils 14 lie between the poles and the measuring chamber for production of a voltage or potential as a measure of the gas whose content is sought. The coils are connected through an amplifier 16 to an indicating or recording instrument 17.

The piezo-electric generators are energized by an 8.5 kv. source of oscillating potential 18 so that the wave length of the emitted sound waves satisfies the relationship $$n \cdot \frac{\lambda}{2} = L$$

With this, a phase shift between the sound generators must exist which amounts to 180° for distance between generators of $(2n-1)$ half wave lengths, and for 0° $n$ wave lengths. Under this set of conditions the pressure variation in the middle of the measuring chamber is at its greatest. The chamber, with magnet system, is situated in a thermostat 15 for eliminating any influence on the measuring voltage due to temperature change.

During operation, the thermostat 15 is held to a constant temperature. The gas mixture to be analyzed is lead into the left holder 2 by the conduit 6 and flows through the space or gap between the ultrasonic generator 4 and the ceramic tube 1 and into the measuring chamber and correspondingly passed through the space between the tube 1 and the ultrasonic generator 5 and the mixture is aspirated through the conduit 7 from the holder 3 by means of the pump 8. The gas mixture in the measuring chamber is agitated from both ends of the tube by the piezo-electric sound generators.

Alteration of the composition of the gas mixture influences the velocity of the sound waves in the mixture. Consequently at constant generator frequency the wave length would change and the generator no longer be resonant for a predetermined length of measuring chamber and varied composition of gas. This condition is avoided or greatly reduced by use of an acoustical feedback coupling. A piezo-electric sensing element 19 is provided at the narrowest place in the measuring chamber, which sensing element over a phase shifter 20 regulates the alternating current electrical generator 18 exciting the sound generators. The sound generators are so excited that the product of the sound frequency and acoustical pressure amplitude remains constant. With this compensation the alternating potentials induced in the coil 14 are proportional to the partial pressure of the oxygen in the gas mixture if the magnetic susceptibility of the carrier gas can be neglected. Changes in the measured potential are then directly proportional to the changes in proportions of oxygen.

If the susceptibility is not negligible, the oxygen content can be determined by using the rule of additive susceptibilities.

The invention claimed is:

1. An analyzer for measuring the paramagnetic gas content in a sample gas mixture, the analyzer comprising a substantially permanent magnet having opposite poles, means forming a measuring chamber between the poles with inlet and outlet openings for the sample gas to be analyzed, means for determining changes of magnetic flux between the poles in the zone of the chamber in accordance with change in magnetic susceptibility of sample gas within the chamber, and for indicating the changes as a measure of the content of paramagnetic gas in the sample gas, and means for subjecting the gas mixture to be analyzed in the chamber to alternations in pressure to produce standing sound waves in the chamber, the frequency of the alternations in pressure, the dimensions of the chamber and the position of the poles being so chosen that a pressure antinode exists in the chamber in the zone of substantially the strongest magnetic flux.

2. An analyzer for measuring paramagnetic gas content in a gas mixture sample, said analyzer comprising a substantially permanent magnet having opposite poles, means forming a gas chamber having an inlet and outlet for the sample gas to be analyzed and between the poles, the chamber containing a zone of substantially maximum flux from said magnet, means for passing the sample gas through the chamber, means for subjecting sample gas within the chamber to alternations in pressure to produce standing sound waves of predetermined wave length within the chamber, the dimension of the chamber, the frequency of the alternations in pressure and position of the poles being so chosen that a pressure antinode exists in the chamber in said zone of substantially maximum flux, means adjacent said zone for producing an electrical potential upon a change of flux between the poles of the magnet due to change in magnetic susceptibility of sample gas in the chamber at said zone, and means for substantially indicating said potential as an indication of change in magnetic susceptibility of the sample gas.

3. An analyzer as claimed in claim 2, said means for producing an electrical potential being out of electrical contact with the means for subjecting gas in the chamber to alternations in pressure.

4. An analyzer as claimed in claim 2 said chamber being tubular in shape having a constriction at said zone and intermediate the ends of the chamber.

5. An analyzer as claimed in claim 2, said means for subjecting sample gas to alternations in pressure being an electrically energized sound generator.

6. An analyzer as claimed in claim 5, the generator being an ultrasonic generator.

7. An analyzer for paramagnetic gas components in a gas mixture comprising a tube of non-magnetic material flaring and open at each end and substantially symmetrical about its transverse axis, vibratory ultrasonic-sound generator elements disposed respectively near and substantially covering the openings of the tube ends but not touching the tube, means for mounting the elements for vibratory movement, means for exciting the element at a chosen frequency, means for conducting sample gas in between the one of said elements and the adjacent end of the tube, then through the tube and out between the other element and tube end, whereby during vibratory movement of said elements standing waves are produced in the sample gas, a magnet having poles receiving the tube therebetween and located at the zone of substantially maximum pressure variations of the gas due to the standing wave to provide magnetic flux at said zone and within the tube, and an inductor coil between the poles of the magnet for producing an electrical potential upon a change of flux within the tube at said zone, whereby a measure of said potential is a measure of the paramagnetic susceptibility of gas within the tube.

8. An analyzer as claimed in claim 7, said two vibratory elements being tuned to produce sound waves of length λ and the distance L between the two elements are related as $$L = n\frac{\lambda}{2}$$

$n$ being a positive whole number, and a phase difference between the two elements of $n \cdot 180°$ exists.

9. An analyzer as claimed in claim 7, the means for exciting the vibratory elements being a source of alternating current, an acoustical sensor in the tube, and means connecting the sensor to the source of alternating current for varying the latter to maintain a constant wave length of sound in said tube to compensate for changes in the acoustical conductivity of gas within the tube.

References Cited

UNITED STATES PATENTS

| 2,283,750 | 5/1942 | Mikelson | 73—24 |
| 2,696,731 | 12/1954 | Luft | 73—23 |
| 2,952,153 | 9/1960 | Robinson | 73—24 X |
| 2,978,899 | 4/1961 | Kritz | 73—24 |
| 3,049,665 | 8/1962 | Hummel | 324—36 |

RICHARD C. QUEISSER, *Primary Examiner.*

J. FISHER, C. IRVIN McCLELLAND,
*Assistant Examiners.*